United States Patent

[11] 3,619,782

[72] Inventor Lyle S. Stokes
Los Angeles, Calif.
[21] Appl. No. 523,653
[22] Filed Jan. 28, 1966
[45] Patented Nov. 9, 1971
[73] Assignee Hughes Aircraft Company
Culver City, Calif.

[54] COHERENT CATV TRANSMISSION SYSTEM
3 Claims, 7 Drawing Figs.

[52] U.S. Cl. .......... 325/9, 178/DIG. 13, 325/63, 325/308
[51] Int. Cl. .......... H04h 1/04, H04b 7/14
[50] Field of Search .......... 325/1, 3, 2, 9, 10, 11, 308, 63, 49, 50, 329, 419, 418, 421, 422; 178/6, 5.6, 6 TT, 6 PD; 343/200, 202, 201

[56] References Cited

UNITED STATES PATENTS

| | | | |
|---|---|---|---|
| 2,530,614 | 11/1950 | Hugenholtz | 325/329 |
| 2,854,506 | 9/1958 | Pickles | 178/6 |
| 2,831,105 | 4/1958 | Parker | 325/3 |
| 3,041,450 | 6/1962 | Parker | 325/51 |
| 3,202,765 | 8/1965 | Byrne | 325/49 X |
| 2,710,343 | 6/1955 | Thompson | 325/3 X |
| 2,871,295 | 1/1959 | Stachiewicz | 325/63 X |
| 3,182,259 | 5/1965 | Holder | 325/50 X |

*Primary Examiner*—Benedict V. Safourek
*Attorneys*—James K. Haskell and Don O. Dennison

ABSTRACT: A community antenna television system wherein one or more microwave transmission links are used between the CATV receiving unit and the user's receivers. In accordance with the invention, the undesirable effects caused by slight frequency differences between the directly transmitted television signals and the relayed television signals are eliminated. This is accomplished by providing at the microwave transmitter a pilot signal having a frequency which is an integral submultiple of the microwave carrier frequency. This pilot signal is transmitted, together with the television broadcast signals over the microwave transmission link or links. At the microwave receiver the pilot signal, together with an integral submultiple of the local oscillator, is utilized in a phase-locked loop to synchronize the local oscillator frequency with the microwave carrier frequency.

INVENTOR.
LYLE S. STOKES,
BY
[signature]
ATTORNEY

COHERENT CATV TRANSMISSION SYSTEM

This invention relates to high-frequency communications systems and more specifically to television relay systems.

Because of the particular propagation characteristics of electromagnetic waves in the VHF and UHF regions, television broadcast receivers in many geographic areas are unable to provide images of acceptable quality. These areas are those which, for reasons of distance or surrounding topography, are unable to obtain sufficiently strong, distortionless signals directly from the main broadcast transmitters. In order to fill this gap in coverage and to provide signals to television viewers who are ordinarily unable to obtain suitable reception, community antenna television systems have been employed.

Such systems, frequently termed CATV systems, generally employ an antenna or antennas advantageously located in a strong signal area to receive the transmitted signals. These signals are then relayed by suitable means to the receivers of users in the areas of poor reception. If the distance over which the received signal is to be relayed is sufficiently small, a coaxial cable can be advantageously utilized as the transmission medium for the relayed signal. Frequently, however, it may be inconvenient or impractical to utilize coaxial cable as the sole transmission medium for the relayed signal. For example, the distances separating the users and the CATV receiving unit may be so great as to prevent the economical utilization of coaxial cable. Furthermore, the impracticality of utilizing underground conduit or overhead poles within a metropolitan area may weigh against the use of coaxial cable transmission media even though the physical distances involved are relatively small. In such instances it is desirable to utilize one or more microwave transmission links in the relay path between the CATV system receiving unit and the users' receivers.

When microwave transmission links are utilized, however, it then becomes necessary to translate the relatively low-frequency UHF or VHF television signals into corresponding signals in the higher-frequency microwave region. Although the relayed television signals can be transmitted over the microwave links by utilizing subcarriers and conventional double-sideband AM or FM modulation techniques, the present invention contemplates the utilization of single-sideband amplitude modulation. As is well known, in single-sideband microwave transmission, it is customary to eliminate the carrier at the microwave transmitter and to supply it again locally at the receiver. In this manner, only half the frequency spectrum of ordinary double-sideband transmission is required. The copending application of B. L. Walsh, Ser. No. 523,727, filed Jan. 28, 1966, since abandoned, now continuation application, Ser. No. 736,544 filed May 31, 1968 now U.S. Pat. No. 3,553,584 describes a balanced modulator circuit for simultaneously translating a plurality of signals having frequencies occurring within the television and FM broadcast bands to the microwave region by single-sideband modulation. At the microwave receiving station it is then necessary to reconvert the signals to frequencies within the television broadcast band for transmission to the users' receivers.

For practical reasons, it is generally desirable that the television signals thus relayed occupy the same frequency channels as originally transmitted from the respective broadcast stations. However, an additional problem arises when this is attempted. This problem is attributed to the beat frequency which occurs because of the slight frequency differences between the relatively weak television carrier signal from the broadcast transmitter and the reconverted carrier signal from the CATV microwave receiving unit.

For example, if the carrier frequency of the originally transmitted television signal is designated $f_c$, then the carrier frequency of the relayed signal should also be $f_c$. In order to accomplish this end in a single-sideband transmission system, however, it is necessary to provide a local oscillator signal which is synchronized in frequency and phase with the nontransmitted microwave carrier. Ordinarily, the local oscillator signal at the microwave receiver will depart from the desired frequency by some small amount. This, in turn, will cause the carrier frequency of the relayed television signal to depart from the desired frequency by the same small amount, $\pm\Delta f$. Thus, it is seen that if the transmitted signal of frequency $f_c$ is of a sufficiently high level at the user's receiver it can mix with the relayed signal to produce a beat frequency signal at $\Delta f$ which ordinarily manifests itself as horizontal bars on the viewing screen of the user's receiver. Such interference is sometimes, although inaccurately, termed "cochannel interference." An obvious method for minimizing the undesirable effects of this difference in frequency is to provide a good electromagnetic shield around the user's receiver. Where only a small number of users are so affected, such a solution may not be too undesirable. However, where many users are affected, such a solution would be both costly and inconvenient.

Accordingly, it is an object of the present invention to provide an improved CATV system which provides simple and economical means for minimizing the effects of frequency differences between the transmitted and relayed signals.

It is another object of the present invention to provide an improved CATV transmission system in which the frequencies of the relayed signals are substantially identical to the frequencies of the respective transmitted signals.

In accordance with the principles of the present invention these objects are accomplished by providing, at the microwave transmitter, an auxiliary or pilot signal having a frequency which is an integral submultiple of the microwave carrier frequency. This pilot signal is transmitted, together with the television broadcast signals, over the microwave link or links. At the microwave receiver the pilot signal, together with an integral submultiple of the local oscillator, is utilized in a phase-locked loop to synchronize the local oscillator frequency with the nontransmitted microwave carrier frequency. In this manner the demodulated television broadcast (i.e. relayed) signals will have precisely the same frequency as the originally transmitted signals.

The above-mentioned and other features and objects of this invention will become more apparent by reference to the following description taken in conjunction with the accompanying drawings, in which.

Figure 1:
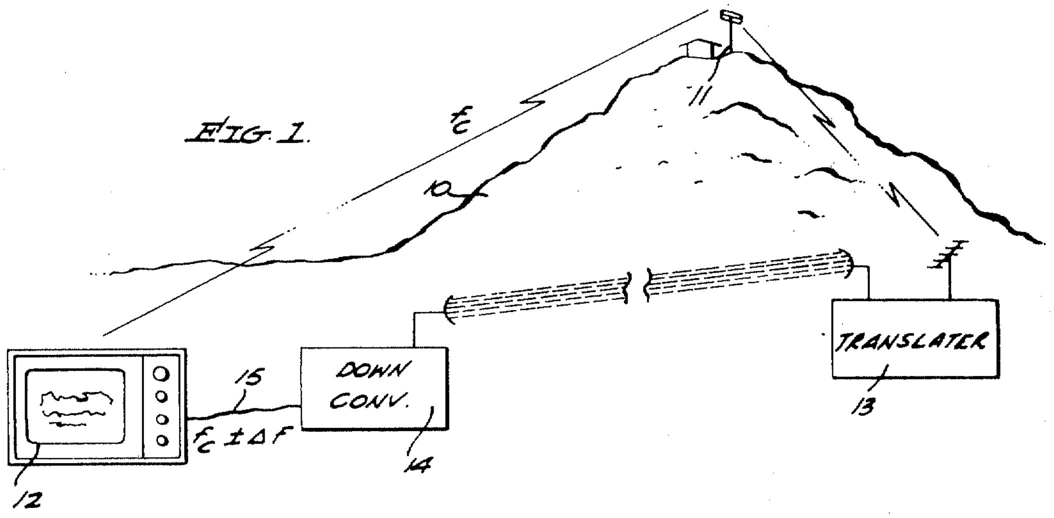
FIG. 1 is a simplified pictorial view of a typical CATV relay arrangement included to facilitate explanation of the present invention.

Referring more specifically to the drawings, FIG. 1 is a pictorial view of a typical CATV system. In FIG. 1 a television broadcast transmitter, situated, for example, on a mountain or hill 10, radiates the television broadcast signal on a carrier frequency $f_c$ from an antenna 11. Remote from the television transmitter location is a user's receiver 12. It is assumed, as mentioned above, that the user is located in a region which, because of distance or surrounding topography, is considered an area of poor reception.

In order to improve the quality of the user's reception, a CATV relay link comprising frequency translator or upconverter 13, a microwave relay path, a downconverter 14, and low-frequency transmission link 15 is utilized. Typically, in order to obtain a high-quality signal from the broadcast transmitter, upconverter 13 utilizes a receiving antenna typically disposed in a region of relatively high signal strength. The received television signal is then translated to a frequency within the microwave region and transmitted over the microwave relay path to down converter 14. At downconverter 14 the television signal is again converted to a frequency as close as possible to the transmitted signal frequency $f_c$, whereupon it is relayed to user's set 12 over low-frequency transmission link 15. The signal produced by the downconverter 14 is herein called the relayed signal. In general, low-frequency transmission link 15 can comprise coaxial cable or other suitable transmission media known in the art. Although only one television broadcast transmitter is shown in the pictorial view of FIG. 1, it is understood that this is merely for the sake of explanation, since it is well known that a number of metropolitan areas have many local television broadcast stations. Therefore, although the present invention will be described in terms of a single television signal having a carrier frequency $f_c$, it is recognized that the description applies equally well to a plurality of simultaneously transmitted television signals, each having their own video and audio carrier frequencies.

As mentioned above, in a CATV system utilizing typical single-sideband amplitude modulation in the microwave link, the carrier frequency of the relayed television signal will differ somewhat from the carrier frequency of the originally transmitted television signal. In other words, the relayed television signal will generally have a carrier frequency equal to $f_c \pm \Delta f$. The difference frequency $\Delta f$ between the originally transmitted carrier frequency and the relayed signal carrier frequency may be decreased by utilizing a carefully controlled local oscillator circuit in the downconverter 14. However, even the most carefully controlled local oscillator is subject to slight frequency drifting.

Figure 2:
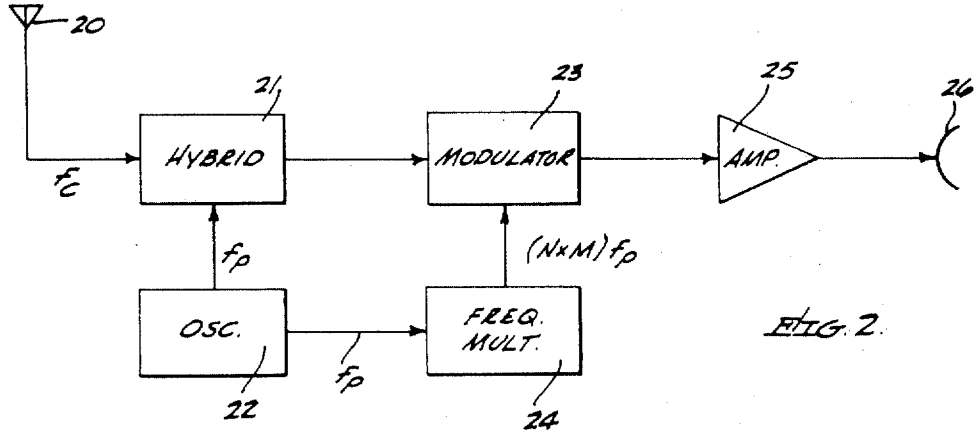
FIG. 2 is a block diagram of one microwave upconverter arrangement utilized in practicing the present invention.

In accordance with the present invention, the carrier frequency of the relayed signal is synchronized with the carrier frequency of the originally transmitted signal by utilizing a pilot signal transmitted along with the television signal over the microwave transmission path. In FIG. 2 there is shown a simplified block diagram of an upconverter circuit utilized in such a system.

In FIG. 2 a receiving antenna 20 is adapted to receive the directly transmitted television signals from the television broadcast transmitters. For the purpose of illustration, it will be assumed that only one television signal having a carrier frequency $f_c$ is received at antenna 20. As mentioned above, however, there can be many received signals, each having its own video and audio carrier frequencies. In any event, the received signal is coupled from receiving antenna 20 to a hybrid network 21 where it is combined with a pilot signal having a frequency $f_p$ generated by an oscillator 22.

In general, the oscillator 22 can comprise a crystal controlled circuit or other oscillator circuit known in the art capable of generating a stabilized frequency output. By the same token, hybrid network 21 can comprise any suitable broadband hybrid network operable in the VHF or UHF television broadcast regions. The exact frequency range of the various circuit elements depend, of course, on the frequencies of the television signals to be relayed. Furthermore, the frequency $f_p$ of the pilot signal is preferably chosen so that it lies in an unoccupied region of the television broadcast band. For example, in the VHF commercial television band $f_p$ can correspond to a frequency between 72 and 76 megacycles per second, which range has not been allocated for television usage. With the exception of possible frequency restrictions placed upon the microwave carrier frequency, to be discussed hereinbelow, the exact frequency $f_p$ of the pilot signal is not critical.

The combined television and pilot signals are coupled out of the hybrid network 21 and fed as a modulating input signal to a modulator 23. A portion of the pilot signal from the oscillator 22 is also coupled to a frequency multiplier circuit 24 which multiplies the frequency by a predetermined ratio designated (N×M), where N and M are integers, and produces a microwave signal having a frequency $(N\times M)f_p$. This microwave signal is then coupled to modulator 23 where it is modulated by the signals from the hydrid network 21. The resultant modulated microwave signal is then coupled to a microwave amplifier 25 and fed to a microwave transmitting antenna 26. Amplifier 25, for example, can comprise a traveling wave tube or other suitable microwave amplifying device know in the art.

In the upconverter of FIG. 2, modulator 23 is shown to be one capable for converting, en masse, the entire spectrum of received television signals to the microwave region. Thus, if the upconverter is intended for operation only in the commercial VHF television region the frequency range of modulator 23 should be from approximately 50 megacycles per second to somewhat over 200 megacycles per second. One device which is capable of such operation is disclosed in the copending application of B. L. Walsh, mentioned hereinabove.

The net operational effect of the upconverter of FIG. 2 can thus be summarized as one of combining a pilot signal with the relatively low-frequency television signals and converting the combined signals to the microwave region. Furthermore, the carrier frequency of the resultant modulated microwave signal, although not transmitted, is an integral multiple of the pilot signal. In order to achieve carrier suppression in an upconverter such as shown in FIG. 2, appropriate filters can be utilized at the output of the modulator 23.

Figure 3:
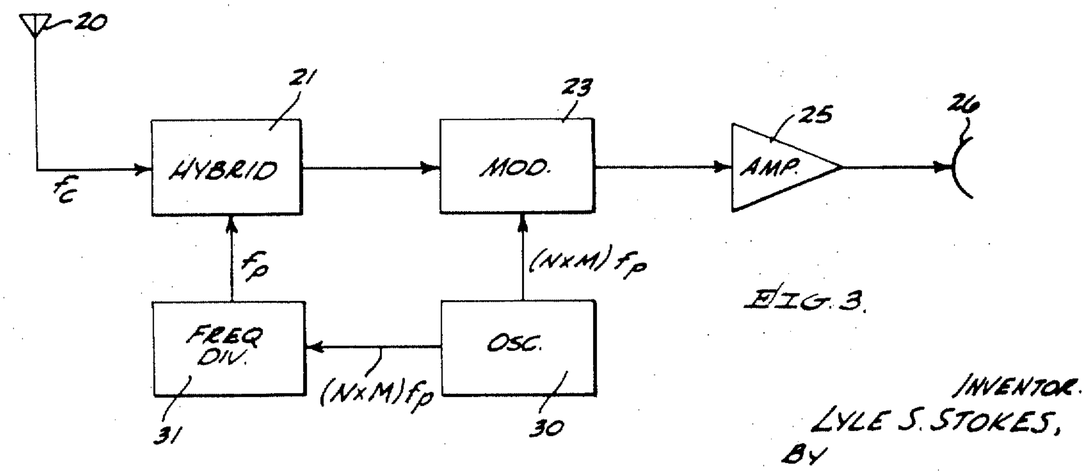
FIG. 3 is a block diagram of an alternative upconverter arrangement.

The frequency translation mentioned above can also be accomplished by the alternate upconverter configuration shown in block diagram form in FIG. 3. In FIG. 3 corresponding numerals have been carried over from FIG. 2 to designate like circuit elements. Instead of an oscillator operating at the pilot frequency $f_p$the embodiment of FIG. 3 utilizes a microwave oscillator 30 generating a microwave output signal at a frequency $(N\times M)f_p$. The pilot signal is then obtained by a frequency divider circuit 31 which divides the oscillator output frequency by a factor (N×M). Thus the pilot signal and the carrier signal are obtained as in the translator of FIG. 2 but by utilizing a different circuit combination.

The operation of the embodiment of FIG. 3 is substantially identical to that of FIG. 2. That is, the incoming television signals received at antenna 20 are combined with the pilot signal at mixer 21 and coupled into modulator 23. At modulator 23 these signals are utilized to modulate the carrier signal from oscillator 30. The modulated microwave signal is then amplified and coupled to transmitting antenna 26. This modulated signal is then transmitted through space or through other microwave transmission media and intercepted by a microwave receiver or downconverter such as those described hereinbelow.

Figure 4:
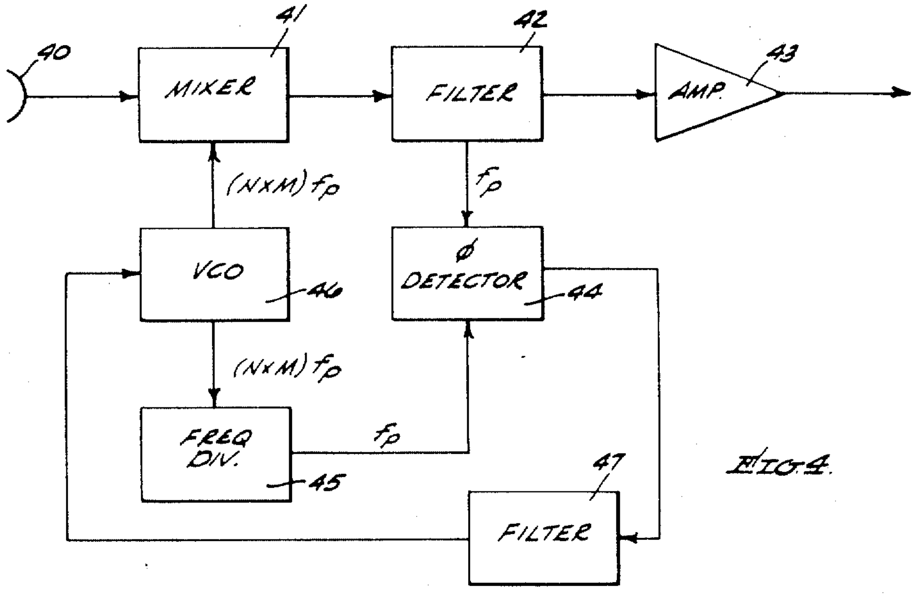
FIG. 4 is a block diagram of one microwave downconverter in accordance with the present invention.

In FIG. 4 there is shown a simplified block diagram of one microwave receiving circuit hereinafter referred to as a downconverter. The circuit of FIG. 4 comprises an antenna 40 adapted to receive the modulated microwave signal from the upconverter. Antenna 40 is coupled to a mixer circuit 41, the output of which in turn is coupled to a filter circuit 42. Filter circuit 42 functions to separate the pilot signal at frequency $f_p$ from the television signal at frequency $f_c$. The television signal is then coupled out of filter circuit 42 to a wideband amplifier 43 and then to a relatively low-frequency transmission system, such as coaxial cable, for distribution to the users' receivers.

In accordance with the principles of the invention, the carrier frequencies of the television signals so distributed are locked to the carrier frequencies of the television signals as originally transmitted. This is accomplished in the downconverter of FIG. 4 by coupling the pilot signal at frequency of $f_p$- from filter 42 to a phase detector circuit 44. A comparison signal at a frequency substantially equal to $f_p$ is applied as an input to phase detector 44. This comparison signal is obtained from a frequency divider circuit 45 which derives its input from a voltage controlled oscillator circuit 46 operating at the local oscillator frequency $(N\times M)f_p$ in the microwave region. An error signal proportional to the phase difference between the pilot signal and the comparison signal is applied to the voltage controlled oscillator 46 through a low pass filter 47 to control the local oscillator frequency thereof.

In operation, the microwave signal comprising the television signal and pilot signal is received at antenna 40. The local oscillator signal, together with this microwave signal, is combined in mixer 41 to yield a detected output signal which comprises the pilot signal and television signals in the relatively low-frequency television broadcast region. The phase-locked loop comprising phase detector 44, frequency divider 45, voltage controlled oscillator 46, and low pass filter 47 serves to maintain a local oscillator frequency equal to the frequency of the microwave carrier. Thus the television output signals from the receiver are of precisely the same frequencies as those originally transmitted by the respective television broadcast transmitters.

Figure 5:
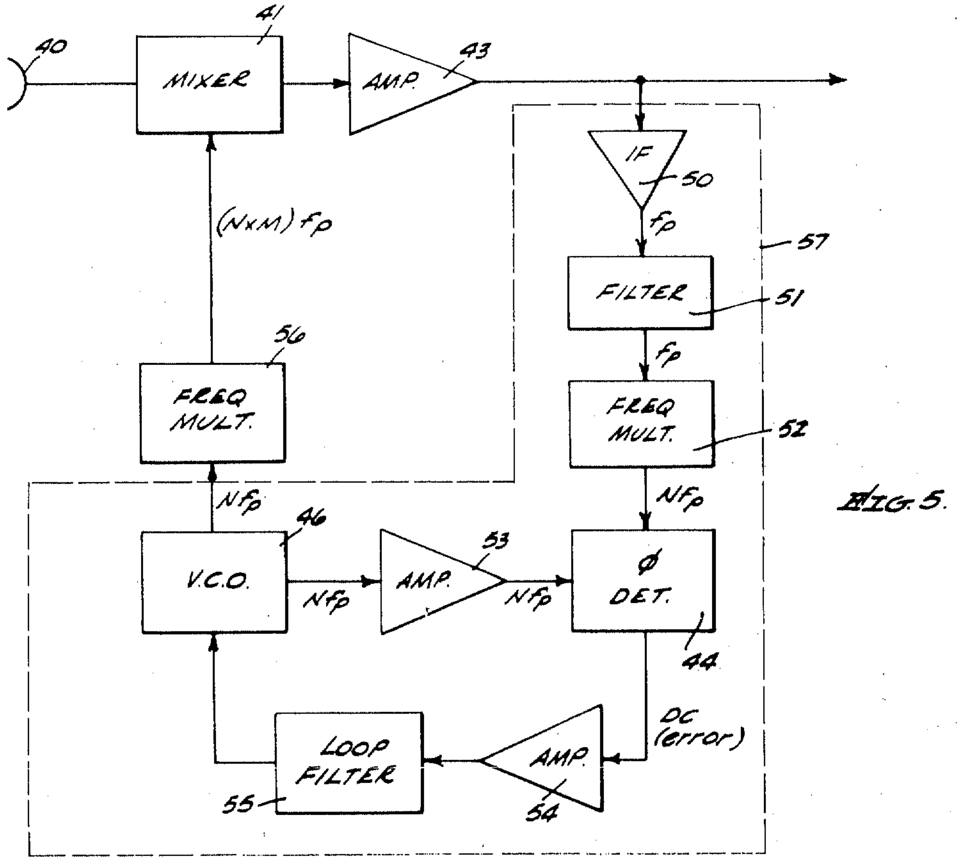
FIG. 5 is a block diagram of an alternative downconverter arrangement.

In FIG. 5 there is shown in more specific block diagram form, an alternative downconverter in accordance with the present invention. Where appropriate, like numerals have been carried over from FIG. 4 to designate like circuit elements. The downconverter of FIG. 5 comprises a mixer 41 wherein the microwave signal from receiving antenna 40 is "-beat down" by the local oscillator signal to yield television signals and a pilot signal in the television broadcast frequency region. The output of mixer 41 is, as before, applied to a wideband amplifier 43 which amplifiers the television signals before distribution to the users' receivers. A portion of the output signal from amplifier 43 is coupled to an intermediate frequency amplifier 50 which amplifies the pilot signal at frequency $f_p$. Intermediate frequency amplifier 50 can be followed by a selective filter circuit 51 if further attenuation of signals at frequencies other than the pilot frequency $f_p$ is desired.

The amplified pilot signal is then coupled to a first frequency multiplier circuit 52 which furnishes an output signal having a frequency $Nf_p$, which is an integral multiple of pilot frequency $f_p$. In general, the factor In general, the factor N is a relatively small integer such as two, in which case circuit 52 would be more appropriately termed a "frequency doubler." In any event, the amplified and multiplied pilot signal is then applied as one input to phase detector 44. A comparison signal also at frequency $Nf_p$ is provided by voltage controlled oscillator 46 through a buffer amplifier 53. The detected output of phase detector 44 is then coupled as an error signal to voltage controlled oscillator 46 via a feedback loop comprising the serial combination of an amplifier 54 and loop filter 55. As in the embodiment of FIG. 4, the error signal is utilized to maintain the phase and frequency of oscillator 46 at the desired submultiple of the carrier frequency. This stabilized oscillator signal at frequency $Nf_p$ is then applied to a second frequency multiplier circuit 56 which multiplies the oscillator frequency by a factor M to produce the local oscillator signal at frequency $(N\times M)f_p$. The output of frequency multiplier 56 is then applied to mixer 41 to mix with the received modulated microwave signal as mentioned above.

Figure 6:
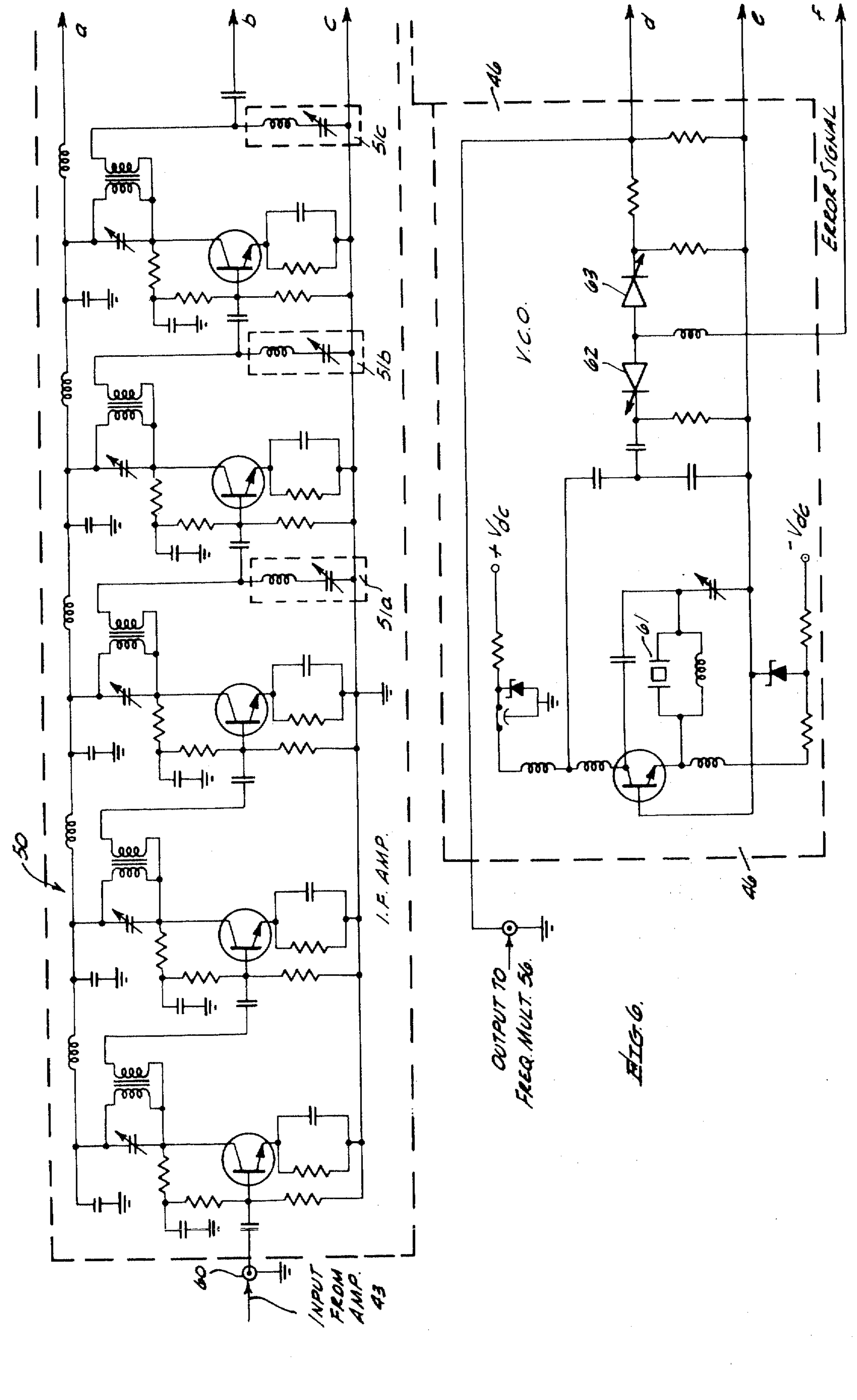
FIG. 6 is a schematic diagram of a portion of the downconverter of FIG. 5.
Figure 7:
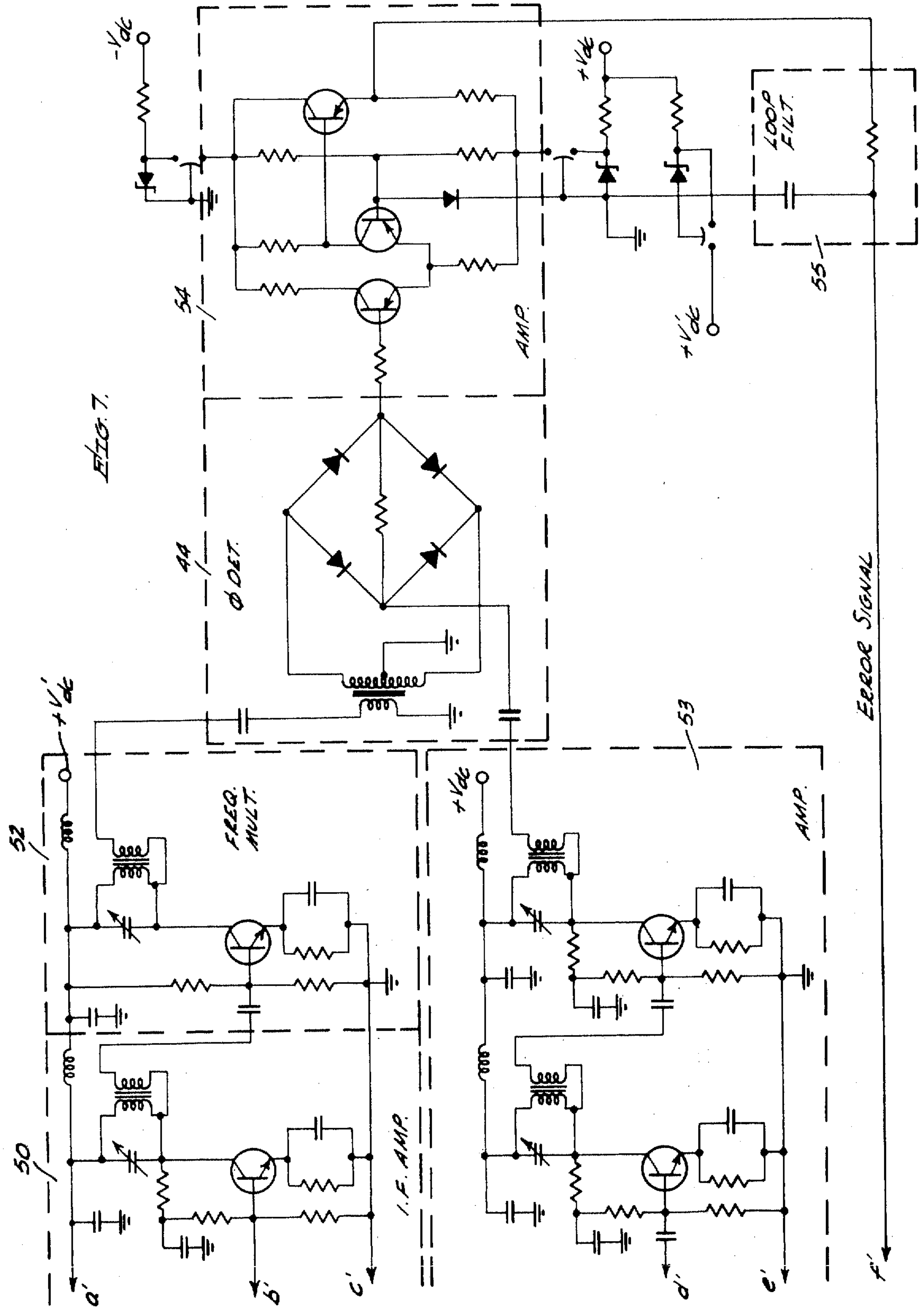
FIG. 7 is a schematic diagram of another portion of the downconverter of FIG. 5.

Many specific circuits can be readily devised by those skilled in the art to realize the upconverters and downconverters shown in block diagram in the preceding figures. In order that the present invention may be more expeditiously carried into effect, however, a portion of the downconverter of FIG. 5 is shown more specifically in schematic diagram form in FIGS. 6 and 7. The diagrams of FIGS. 6 and 7 are included solely for the sake of example, however, and are not to be deemed as limiting the scope of the present invention. Generally, the circuits of FIGS. 6 and 7 are merely adaptations or combinations of circuits well known in the art and, therefore, will be described only briefly herein.

FIGS. 6 and 7 taken together represent specific circuits which can be employed to realize that portion of the downconverter of FIG. 5 outlined by dashed line 57. The combinations of circuit elements corresponding to the function blocks of FIG. 5 are indicated by the dashed lines and are identified by like numerals.

In FIG. 6, five tuned amplifier stages are shown as comprising I.F. amplifier 50. Input means are provided by a coaxial coupler 60 which is adapted for connection to the output of amplifier 43, not shown. It is apparent that a smaller or greater number of stages of amplification can be utilized, depending upon the overall gain desired and the gain per stage available. Selective filters 51*a*, 51*b*, and 51*c* are provided in the input circuit of the last three stages of amplification. Filters 51*a*, 51*b* and 51*c* are merely series resonant traps which can be tuned to reject undesired signals near the pilot frequency $f_p$.

The voltage controlled oscillator 46, also shown in FIG. 6, is of the crystal controlled type wherein the nominal operating frequency is determined by the inherent oscillating frequency of a piezoelectric crystal 61. The operating frequency, however, can be varied from the nominal frequency over a relatively small range by means of the error signal in conjunction with voltage-sensitive variable capacitance diodes 62 and 63.

The error signal is derived from phase detector 44 and coupled through the serial combination of amplifier 54 and loop filter 55, all of which are shown in FIG. 7. Also shown in FIG. 7 is amplifier 53 which is interposed as a buffer between voltage controlled oscillator 46 and phase detector 44. Amplifier 53 is shown as comprising two tuned stages of amplification. Again the number of stages utilized is not critical and can be more or less than the two stages shown in FIG. 7, depending upon the desired gain.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. A television transmission system comprising, in combination, means adapted to receive television broadcast signals, said signals each having predetermined carrier frequencies within a given band of frequencies;

means for generating a pilot signal having a frequency within said band;

means for combining said pilot signal with said received television broadcast signals;

means for converting said combined signals to an amplitude modulated single sideband signal in the microwave frequency region, the carrier frequency of said microwave signal being an integral multiple of said pilot frequency;

means for transmitting said microwave signal over an extended signal wave transmission path;

means for receiving said transmitted microwave signal;

means for reconverting said signals to frequencies within said given band, said reconverting means including means responsive to said received pilot signal for synchronizing the carrier frequencies of said reconverted television signals with said predetermined carrier frequencies; and means for distributing said reconverted synchronized television signals to a plurality of utilization devices.

2. A television transmission system comprising, in combination, means adapted to receive television broadcast signals, said signals each having predetermined carrier frequencies within a given band;

means for generating a pilot signal having a frequency within said band;

means for combining said pilot signal with said received television broadcast signals;

means for converting said combined signals to an amplitude modulated single-sideband signal in the microwave frequency region, the carrier frequency of said microwave signal being an integral multiple of said pilot frequency;

means for transmitting said microwave signal over an extended signal wave transmission path;

means for receiving said transmitted microwave signal;

means for reconverting said received microwave signal to frequencies within said given band, said reconverting means including a mixer and a local oscillator signal source, said reconverting means including further means responsive to said received pilot signal for synchronizing the frequency of said local oscillator signal with the frequency of said microwave carrier; and means for applying said reconverted television signals to a low-frequency signal wave transmission path for utilization.

3. The system, according to claim 2, wherein said synchronizing means comprises a phase-locked loop capable of generating an error signal in response to differences in frequency and phase between said received pilot signal and an integral subharmonic of said local oscillator signal frequency, and wherein said local oscillator signal source includes means for varying the frequency thereof in response to said error signal to minimize said difference.

* * * * *